United States Patent
Hoydis

(10) Patent No.: US 11,556,799 B2
(45) Date of Patent: Jan. 17, 2023

(54) CHANNEL MODELLING IN A DATA TRANSMISSION SYSTEM

(71) Applicant: NOKIA TECHNOLOGIES OY, Espoo (FI)

(72) Inventor: Jakob Hoydis, Paris (FR)

(73) Assignee: NOKIA TECHNOLOGIES OY, Espoo (FI)

( * ) Notice: Subject to any disclaimer, the term of this patent is extended or adjusted under 35 U.S.C. 154(b) by 315 days.

(21) Appl. No.: 16/959,239

(22) PCT Filed: Jan. 2, 2018

(86) PCT No.: PCT/FI2018/050004
§ 371 (c)(1),
(2) Date: Jun. 30, 2020

(87) PCT Pub. No.: WO2019/135019
PCT Pub. Date: Jul. 11, 2019

(65) Prior Publication Data
US 2020/0334542 A1 Oct. 22, 2020

(51) Int. Cl.
*G06N 3/08* (2006.01)
*G06F 17/18* (2006.01)
(Continued)

(52) U.S. Cl.
CPC .............. *G06N 3/084* (2013.01); *G06F 17/18* (2013.01); *G06N 3/0454* (2013.01); *H04L 25/03343* (2013.01)

(58) Field of Classification Search
CPC ............ G06N 3/02; G06N 3/084; G06N 3/10; G06N 3/04; G06F 17/18; H04L 25/03165; H04L 25/03343
See application file for complete search history.

(56) References Cited

U.S. PATENT DOCUMENTS

2018/0322366 A1* 11/2018 Lim ................ G06V 10/82
2018/0341836 A1* 11/2018 Lim ................ G06V 30/194
(Continued)

FOREIGN PATENT DOCUMENTS

EP 1 566 936 A1 8/2005

OTHER PUBLICATIONS

Communication pursuant to Article 94(3) EPC dated Jan. 17, 2022 corresponding to European Patent Application No. 18700517.8.
(Continued)

*Primary Examiner* — Brian D Nguyen
(74) *Attorney, Agent, or Firm* — Squire Patton Boggs (US) LLP

(57) ABSTRACT

Apparatuses, systems and methods are described including: converting generator inputs to a generator output vector using a generator, wherein the generator is a model of a channel of a data transmission system and wherein the generator comprises a generator neural network; selectively providing either the generator output vector or an output vector of the channel of the data transmission system to an input of a discriminator, wherein the discriminator comprises a discriminator neural network; using the discriminator to generate a probability indicative of whether the discriminator input is the channel output vector or the generator output vector; and training at least some weights of the discriminator neural network using a first loss function and training at least some weights of the generator neural network using a second loss function in order to improve the accuracy of the model of the channel.

20 Claims, 6 Drawing Sheets

(51) Int. Cl.
*G06N 3/04* (2006.01)
*H04L 25/03* (2006.01)

(56) References Cited

U.S. PATENT DOCUMENTS

2019/0122120 A1* 4/2019 Wu ..................... G06N 3/0472
2019/0138860 A1* 5/2019 Liu ..................... G06N 3/0454
2020/0081982 A1* 3/2020 Tu ........................ G06F 40/126
2020/0134473 A1* 4/2020 Miyato ................ G06N 3/0454

OTHER PUBLICATIONS

International Search Report and Written Opinion dated Sep. 21, 2018 corresponding to International Patent Application No. PCT/FI2018/050004.
Sebastian Dorner et al: "Deep Learning Based Communication Over the Air," Jul. 11, 2017, pp. 1-11, XP055487519.
Timothy J. O'Shea et al: "An Introduction to Machine Learning Communications Systems," arxiv.org, Cornell University Library, Feb. 2, 2017, XP080746465, pp. 1-10.
Timothy O'Shea et al: "An Introduction to Deep Learning for the Physical Layer," IEEE Transactions on Cognitive Communications and Networking, IEEE, vol. 3, No. 4, Dec. 22, 2017, pp. 563-575, XP011675252.
Sebastian Cammerer et al: "Scaling Deep Learning-based Decoding of Polar Codes via Partitioning," arxiv.org, Cornell University Library, Feb. 22, 2017, XP080748134.

* cited by examiner

CHANNEL MODELLING IN A DATA TRANSMISSION SYSTEM

FIELD

The present specification relates to channel modelling in a data transmission system, such as a communication system.

BACKGROUND

A simple data transmission system, such as a communication system, includes a transmitter, a transmission channel and a receiver. The design of such communication systems typically involves the separate design and optimisation of each part of the system. An alternative approach is to consider the entire communication system as a single system and to seek to optimise the entire system. Although some attempts have been made in the prior art, there remains scope for further improvements and implementations in this area.

SUMMARY

This section will be completed once the form of the claims has been agreed.

BRIEF DESCRIPTION OF THE DRAWINGS

Example embodiments will now be described, by way of non-limiting examples, with reference to the following schematic drawings, in which.

DETAILED DESCRIPTION

Figure 1:
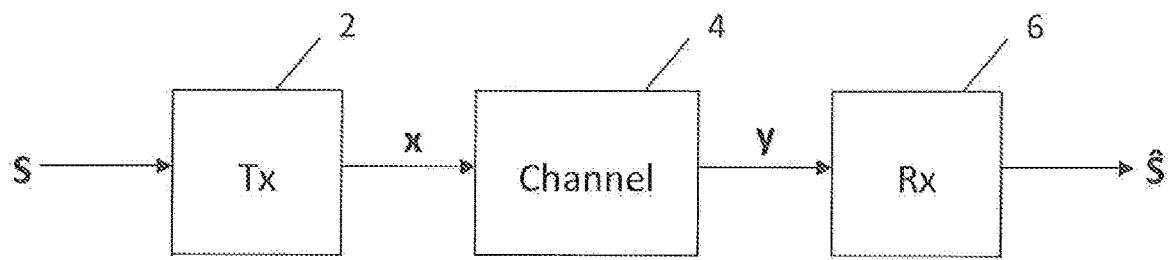
FIG. 1 is a block diagram of an example communication system.

FIG. 1 is a block diagram of an example communication system, indicated generally by the reference numeral 1. The communication system 1 comprises a transmitter 2, a channel 4 and a receiver 6. The transmitter 2 receives and encodes symbols s and transmits the encoded symbols to the receiver 6 via the channel 4. The receiver 6 receives signals from the channel 4 and decodes the received symbols to provide decoded output symbols ŝ that, in a perfect system, would be identical to the symbols s received at the transmitter.

The transmitter 2 may communicate one out of M possible messages $s \in \mathcal{M} = \{1, 2, \ldots, M\}$ to the receiver 6. To this end, the transmitter 2 sends complex-valued vector representations $x=x(s) \in \mathbb{C}^n$ of the messages through the channel 4. (These representations can be IQ samples that will be fed directly into a digital-to-analog converter (DAC) or they can undergo further deterministic transformations in the transmitter hardware, such as filtering or quantization.) Generally, the transmitter hardware imposes constraints on x, e.g., an energy constraint $\|x\|_2^2 \leq n$, an amplitude constraint $|x_i| \leq 1 \forall i$, or an average power constraint $\mathbb{E}[|x_i|^2] \leq 1 \forall i$. The channel is described by the conditional probability density function $p(y|x)$, where $y \in \mathbb{C}^{n_{rx}}$ denotes the received signal. Upon reception of y, the receiver produces the estimate ŝ of the transmitted message s.

By implementing the transmitter 2 and the receiver 6 using neural networks, the neural networks can be jointly trained with the goal of minimizing the error probability $P_r(s \neq \hat{s})$. In this way, the end-to-end performance of the system 1 can be optimised. (Note that other performance metrics could be used, such as the mean squared error (MSE).)

As shown in FIG. 1, the system 1 receives a transmitter input vector s. The input s is encoded by the transmitter 2. The neural network of the transmitter 2 is used to transform the input s into a signal for transmission using the channel 4. The neural network may include multiple layers (a so-called deep neural network). For example, the transmitter neural network may have some layers with weights that are trainable and some layers with weights that are fixed. Similarly, the receiver 6 is used to transform the output of the channel into the output ŝ. The neural network of the receiver 6 may include multiple layers (a so-called deep neural network). For example, the receiver neural network may have some layers with weights that are trainable and some layers with weights that are fixed.

In the context of a communication system, the output ŝ is typically the receiver's best guess of the input s. The receiver 6 may include a loss function that monitors how accurately the output ŝ matches the input s. The output of the loss function can then be used in training the weights of the neural network of the transmitter and/or the neural network of the receiver.

In order to implement end-to-end training for the system 1, a generative model of the channel $p(y|x)$ is generally required that can be implemented using a neural network with input x and output y. An example of such a generative model is the additive white Gaussian noise (AWGN) channel. Here, the channel simply adds Gaussian distributed random variables with a pre-defined or random variance to the channel input. However, in a practical system, the channel model is far more complex and difficult to model accurately.

In many cases, no such exact model $p(y|x)$ of the channel 4 exists. In some circumstances, an approximation may be available. In yet further circumstances, not even an adequate approximation is available.

Figure 2:
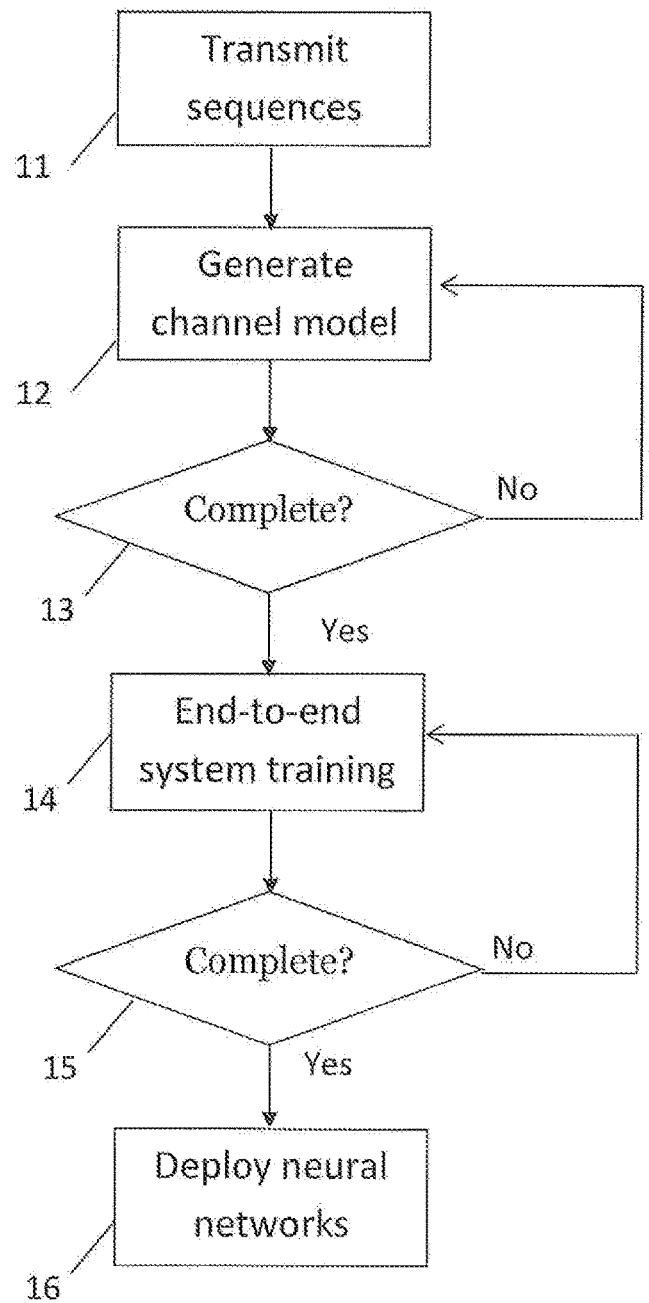
FIG. 2 is a flow chart showing an algorithm in accordance with an example embodiment.

FIG. 2 is a flow chart showing an algorithm, indicated generally by the reference numeral 10, in accordance with an example embodiment.

The algorithm 10 starts at operation 11, where known sequences are transmitted using the system 1. Thus, the transmitter 2 sends known complex-valued vectors x over the channel 4. Note, that the step of transforming inputs s into the corresponding vectors x is not needed here. The vectors x can be either deterministic or generated randomly according to some chosen distribution. At the receiver, complex-valued vectors y are received and stored. No further processing is carried out at this step. The set of transmitted and received vectors x and y constitutes the data set which will be used in the next operation.

The data set generated at operation 11 is used in operation 12 in the generation of a channel model for the channel 4. With a channel model generated at operation 12, the algorithm 10 moves to operation 13 where it is determined whether or not the channel modelling process is complete. If so, the algorithm moves to operation 14; otherwise, the algorithm returns to operation 12. An implementation of the operations 12 and 13 is described in detail below.

Once the channel modelling process of operations 12 and 13 has been completed, the algorithm 10 moves to operation 14, where end-to-end training of the system 1 is carried out in order to optimise neural networks that define the functionality of the transmitter 2 and the receiver 6. During this process, the channel model generated in operation 12 is used as the channel between the transmitter and receiver. Further details regarding an implementation of the operation 14 is provided below.

With end-to-end training of the system 1 carried out at operation 14, the algorithm 10 moves to operation 15 where it is determined whether or not the end-to-end training process is complete. If so, the algorithm moves to operation 16; otherwise, the algorithm returns to operation 14.

At operation 16, the transmitter and receiver neural networks defined in operation 14 are deployed on the communication system 1, which communication system includes the real channel.

Figure 3:
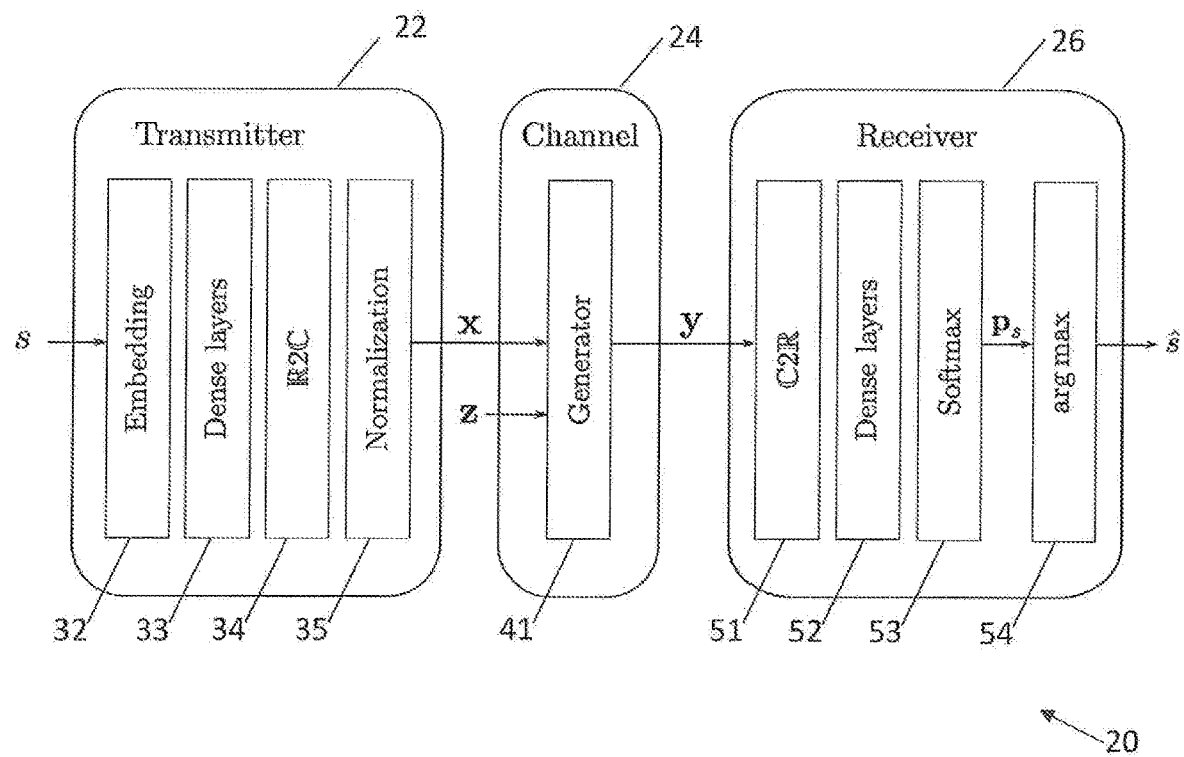
FIG. 3 is a block diagram of a system in accordance with an example embodiment.

FIG. 3 is a block diagram of a system, indicated generally by the reference numeral 20, in accordance with an example embodiment. The system 20 comprises a transmitter 22, a channel 24 and a receiver 26. The transmitter, channel and receiver shown in FIG. 3 are examples of the transmitter 2, channel 4 and receiver 6 of the system 1 described above. Note that the channel 24 in this block diagram is a generative channel model and not the real channel.

As shown in FIG. 3, the transmitter 22 receives an input s and provides an output vector x, where $s \in \mathbb{M}$ and $x \in \mathbb{C}^n$. The transmitter 22 includes an embedding module 32, a dense layer of one or more neural networks 33, a complex vector generator 34 and a normalization module 35.

The input s is fed into the embedding module 32, embedding: $\mathbb{M} \mapsto \mathbb{R}^{n_{emb}}$, that transforms s into an $n_{emb}$-dimensional real-valued vector. Alternatively, the message index can be one-hot encoded and directly fed into the dense layer 33.

The embedding layer 32 can optionally be followed by several dense neural network (NN) layers 33 (as shown in FIG. 3) with different possible activation functions, such as ReLU, sigmoid, tan h, linear etc. (also known as a multilayer perceptron (MLP)). The final layer of the neural network 33 typically has 2n output dimensions and a linear activation function. If no dense layer is used, $n_{emb} = 2n$.

The output of the neural network 33 is converted to a complex-valued vector (by complex vector generator 34) through the mapping $\mathbb{R}2\mathbb{C}: \mathbb{R}^{2n} \mapsto \mathbb{C}^n$, which could be implemented as $\mathbb{R}2\mathbb{C}(w) = w_0^{n-1} + jw_n^{2n-1}$.

A normalization is applied (in normalization module 35) that ensures that power, amplitude, or other constraints are met. The result of the normalization process is the transmit vector x of the transmitter 22 (where $x \in \mathbb{C}^n$). Note that the order of the complex vector generation and the normalization could be reversed.

The transmit vector is then fed into the channel 24, which channel is modelled by a generator 41, as described in detail below. Each time the generator 41 is used, an additional input vector $z \in \mathbb{C}^L$ is randomly drawn from some distribution $p_z(z)$, e.g., $z \sim \mathcal{CN}(0, I_L)$. The generator 41 then maps the pair x, z to the output vector y. In other words, the generator 41 implements the mapping G: $\mathbb{C}^n \times \mathbb{C}^L \mapsto \mathbb{C}^{n_{rx}}$. The generator 41 is implemented as another neural network that is trained prior to being used with a method described below (e.g. during the operation 12 referred to above). As discussed below, the generator 41 is implemented using a neural network; accordingly, the gradient of the channel model can be calculated through backpropagation.

The receiver 26 receives a vector y, where $y \in \mathbb{C}^{n_{rx}}$ and provides an output $\hat{s}$. The receiver 20 includes a real vector generator 51, a dense layer of one or more neural networks 52, a softmax module 53 and an arg max module 54.

The received vector $y \in \mathbb{C}^{n_{rx}}$ is transformed (by the real vector generator 51) into a real-valued vector of $2n_{rx}$ dimensions through the mapping $\mathbb{C}2\mathbb{R}: \mathbb{C}^{n_{rx}} \mapsto \mathbb{R}^{2n_{rx}}$, which could be implemented as $\mathbb{C}2\mathbb{R}(z) = [\mathcal{R}\{z\}^T, \mathcal{J}\{z\}^T]^T$.

The result is fed into several dense neural network layers (the neural networks 52) with possibly different activation functions (e.g. ReLU, tan h, sigmoid, linear). The last layer has M output dimensions to which a softmax activation is applied (by softmax module 53). This generates the probability vector $p_s \in \mathbb{R}^M$, whose ith element $[p_s]_i$ can be interpreted as Pr(s=i|y). A hard decision for the message is obtained as $\hat{s} = \arg\max(p)$ (by the arg max module 54).

End-to-end training of the autoencoder of the system 20 (implementing the operation 14 described above) can be implemented, for example, using stochastic gradient descent (SGD). For example, the following categorical cross-entropy loss function may be used: $L = -\log([p_s]_s)$. However, as noted above, there remains the problem that a channel model for the channel 24 needs to be defined in order for the autoencoder of the end-to-end learning system to be applied.

Figure 4:
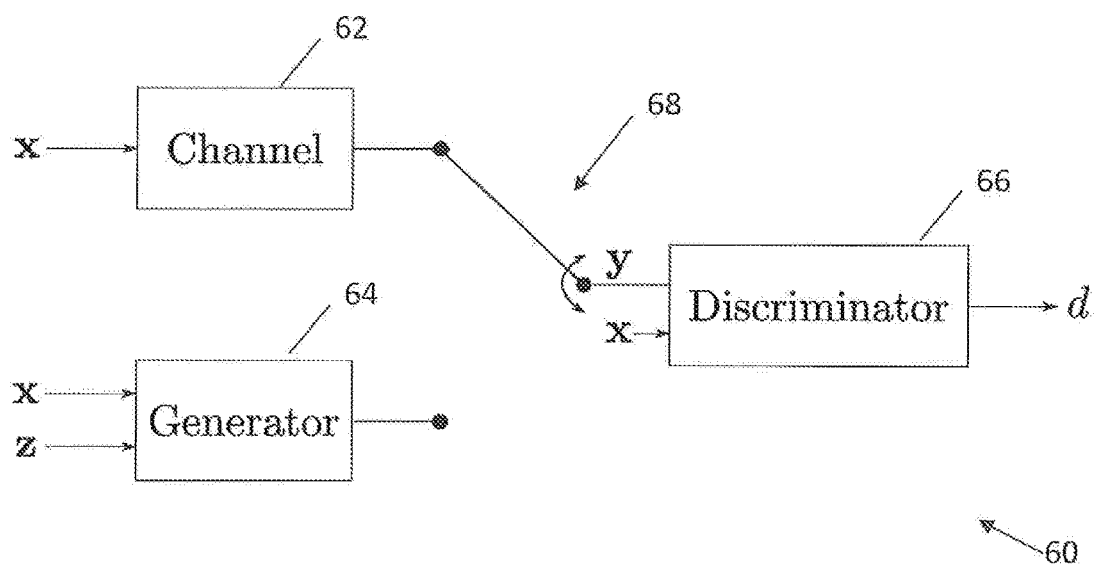
FIG. 4 is a block diagram of a system in accordance with an example embodiment.

FIG. 4 is a block diagram of a system, indicated generally by the reference numeral 6o, in accordance with an example embodiment. The system 60 comprises a channel 62, a generator 64 and a discriminator 66.

The channel 62 is a real channel of a communication system (such as the channel 4 described above). The generator 64 is a model of the channel 62 (and may, therefore, be used as the channel model 24 described above).

The channel 62 receives an input x (e.g. the output of the transmitter 2 or 22) and provides an output vector y. The generator 64 also receives the input x at a first input and additionally receives the random additional vector z at a second input. (As indicated above, the vector $z \in \mathbb{C}^L$ may be randomly drawn from some distribution $p_z(z)$, e.g., $z \sim \mathcal{CN}(0, I_L)$.) The generator 64 provides an output $\tilde{y}$ which is an estimate of the channel output y, given the inputs x and z.

On the basis of a selector 68, the discriminator 66 receives either the output y from the channel or the output $\tilde{y}$ from the generator 64. The discriminator aims to decide, for a given input, whether the input of the discriminator has been received from the real channel 62 or the generator 64. The discriminator output $d \in [0,1]$ can be interpreted as the probability that the discriminator attributes to y being "real", i.e. a real channel observation and not an artificially generated one. The discriminator describes the mapping D: $\mathbb{C}^{n_{rx}} \times \mathbb{C}^n \mapsto [0,1]$.

Thus, the system 6o is an example of a conditional generative adversarial network (GAN). As described in detail below, improving the ability of the discriminator 66 to determine whether an input is received from the real channel or the generator model, while simultaneously improving the capability of the generator 64 to "fool" the discriminator, are the principles of a generative adversarial network (GAN). After training such a GAN, the generator should match the behaviour of the real channel more closely. Thus, the quality of the channel model defined by the generator 64 is improved.

Figure 5:
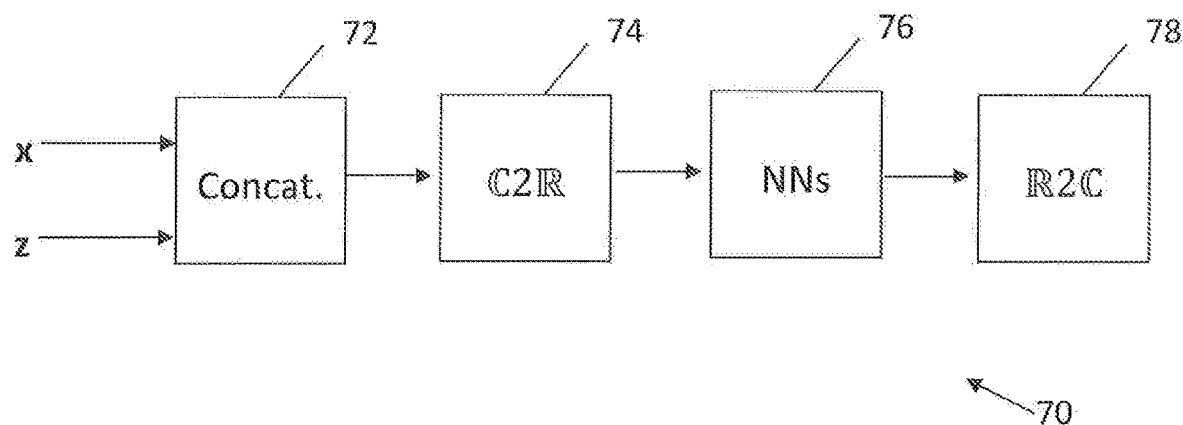
FIG. 5 is a block diagram of a generator in accordance with an example embodiment.

FIG. 5 is a block diagram of a generator, indicated generally by the reference numeral 70, in accordance with an example embodiment. The generator 70 is a highly schematic example implementation of the generator 64 (and the generator 41) described above.

The generator 70 comprises a concatenation module 72, a real vector generator 74, a dense layer of neural networks 76 and a complex vector generator 78.

The inputs to the generator 70 (the vectors x and z described above) are concatenated by the concatenation module 72. The concatenated inputs are then converted into a real vector by the real vector generator 74. The real vector generated by the module 74 is fed into a number of dense layers of neural networks 76. The results output of the neural network is converted back into a complex vector by complex vector generator 78. The output of the complex vector generator 78 is the output vector $\tilde{y}$ of the generator 70.

Figure 6:
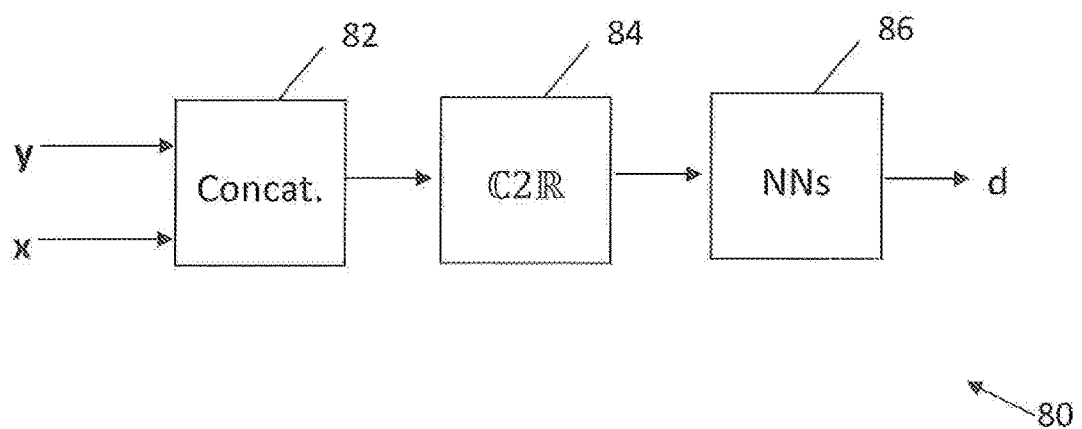
FIG. 6 is a block diagram of a discriminator in accordance with an example embodiment.

FIG. 6 is a block diagram of a discriminator, indicated generally by the reference numeral 80, in accordance with an example embodiment. The discriminator 80 is a highly schematic example implementation of the discriminator 66 described above.

The discriminator 80 comprises a concatenation module 82, a real vector generator 84 and a dense layer of neural networks 86. The output of the neural networks 86 is the output d of the discriminator.

The inputs to the discriminator (the vectors x and y described above) are concatenated by the concatenation module 82. The concatenated inputs are then converted into a real vector by the real vector generator 84. The real vector generated by the module 84 is fed into a number of dense layers of neural networks 86. The output of the last layer of the neural network 76 is a single real output and an activation function, such as the sigmoid function, which ensures that $d \in [0,1]$.

Other options for implementing the generator 70 and the discriminator 80 are possible. For example, the generator may have two parallel input branches (one for x and one for z) which are combined at later neural network layers. It is also possible that some of the generator layers carry out stochastic transformations, such that they depend on other random variables, which are generated on-the-fly. The structure of the generator neural network can also be derived from some known channel effects, such as pulse shaping, clipping, time, frequency or phase offsets, convolution with a random channel impulse response or non-linear hardware (e.g. power amplifiers). As mentioned above, the generator implements the mapping $G: \mathbb{C}^n \times \mathbb{C}^L \mapsto \mathbb{C}^{n_{rx}}$.

Figure 7:
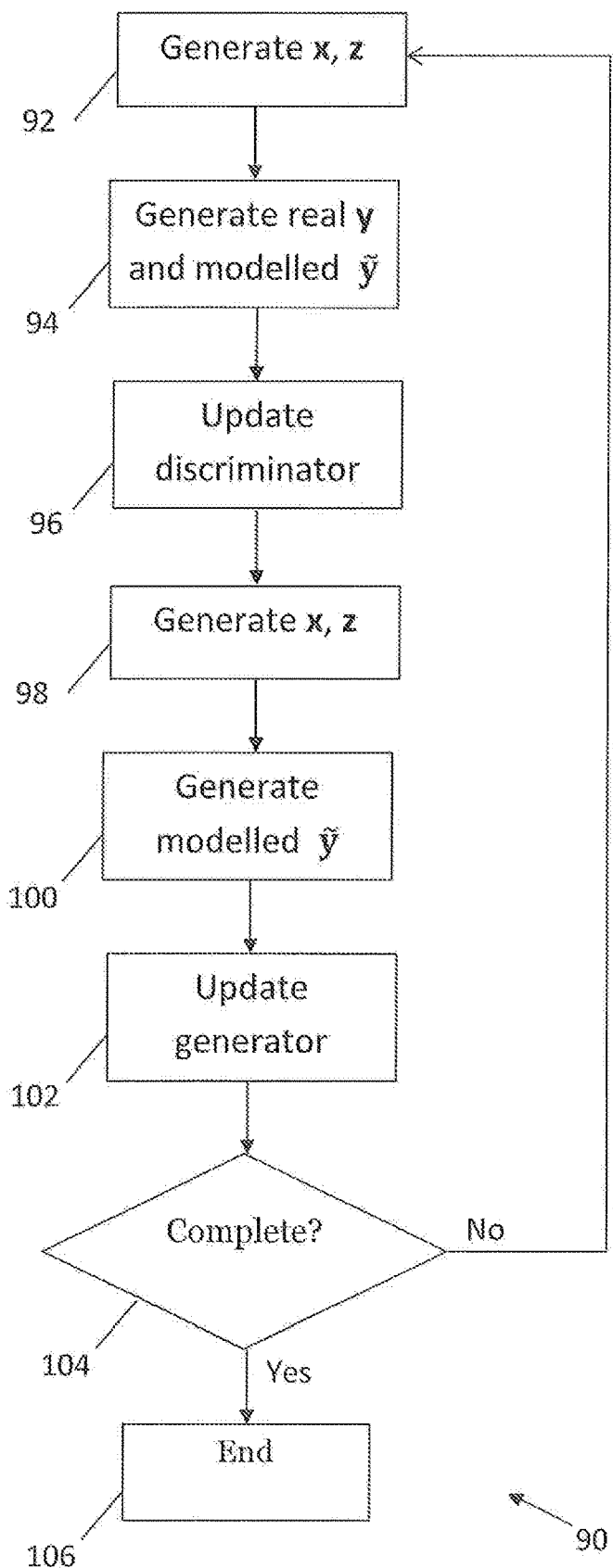
FIG. 7 is a flow chart showing an algorithm in accordance with an example embodiment.

FIG. 7 is a flow chart showing an algorithm, indicated generally by the reference numeral 90, in accordance with an example method for training the generator 64 and the discriminator 66. The algorithm 90 is one implementation of the operations 12 and 13 of the algorithm 10 described above.

The algorithm 90 starts at operation 92 where vectors x and z are generated.

At operation 92, a sample mini-batch of M samples $\{x_1, \ldots, x_M\}$ is generated from a distribution $p_x(x)$ that satisfies the imposed constraints on x. Similarly, a sample mini-batch of M samples $\{z_1, \ldots, z_M\}$ is generated from $p_z(z)$.

At operation 94, a real vector y and a model output vector $\tilde{y}$ are generated. The real vector y is generated by transmitting the vector $x\{x_1, \ldots, x_M\}$ through the channel 62 to obtain the (real) observations $\{y_1, \ldots, y_M\}$. (Note that this step corresponds to operation 11 in FIG. 2.) Similarly, the vectors x and z are passed through the generator 64 to generate model observations $\{\tilde{y}_1, \ldots, \tilde{y}_M\}$ according to $\tilde{y}_i = G(x_i, z_i)$.

At operation 96, the weights of discriminator 66 are updated by as ascending its stochastic gradient:

$$\nabla_{\theta_D} \frac{1}{M} \sum_{i=1}^{M} [\log(D(y_i, x_i)) + \log(1 - D(\tilde{y}_i, x_i))]$$

In the equation above:
- $\theta_D$ is a vector containing all trainable parameters of the discriminator 66.
- $\nabla_{\theta_D}$ is the gradient of the trainable parameters of the discriminator 66.
- $D(y_i, x_i)$ is a function expressing the confidence of the discriminator 66 that the signal $y_i$ (for a given input $x_1$) is received from the real channel. Given that $y_i$ is received from a real channel, the function should tend towards 1.
- $D(\tilde{y}_i, x_i)$ is a function expressing the confidence of the discriminator that the signal $\tilde{y}_i$ (for a given input $x_i$) is received from the real channel. Given that $\tilde{y}_i$ is not received from a real channel, the function should tend towards 0, such that the function $(1 - D(\tilde{y}_i, x_i))$ should tend towards 1.

The goal of this training step is to improve the discriminator, hence to increase the loss.

It should be noted that alternative loss functions are possible.

At operation 98, a further sample mini-batch of M samples $\{x_1, \ldots, x_M\}$ is generated from a distribution $p_x(x)$ that satisfies the imposed constraints on x. Similarly, a sample mini-batch of M samples $\{z_1, \ldots, z_M\}$ is generated from $p_z(z)$.

At operation 100, a further model output vector $\tilde{y}$ is generated. The vectors x and z are passed through the generator 64 to generate model observations $\{\tilde{y}_1, \ldots, \tilde{y}_M\}$ according to $\tilde{y}_i = G(x_i, z_i)$.

At operation 102, the weights of the generator 64 are updated by descending its stochastic gradient:

$$\nabla_{\theta_G} \frac{1}{M} \sum_{i=1}^{M} \log(1 - D(\tilde{y}_i, x_i))$$

In the equation above:
- $\theta_G$ is a vector containing all trainable parameters of the generator 64.
- $\nabla_{\theta_G}$ is a gradient of the trainable parameters of the generator 64.
- $D(\tilde{y}_i, x_i)$ is a function expressing the confidence of the discriminator 66 that the signal $\tilde{y}_i$ (for a given input $x_i$) is received from the real channel. Given that $\tilde{y}_i$ is not received from a real channel, the function should tend towards 0, such that the function $(1 - D(\tilde{y}_i, x_i))$ should tend towards 1.

However, the goal of this step is to improve the generator, i.e., becoming better at fooling the discriminator, hence to decrease the loss. It should be noted that alternative loss functions are possible.

At operation 104, it is determined whether the algorithm 90 is complete (thereby implementing operation 13 of the algorithm 10). If so, the algorithm 90 terminates at operation 106; otherwise, the algorithm 90 returns to operation 92.

Refer again to FIG. 2. The operation 13 in which a determination is made regarding whether the channel model generation process has been completed may take many forms. For example, the operation 12 may be repeated a number of times, or may be repeated until a target accuracy has been reached (e.g. until a defined performance of the discriminator and generator is achieved). Alternatively, the complete step 13 may determine that the channel model generation process is complete if the relevant loss functions have not changed by a significant amount over a defined number of iterations of the operation 12. A combination of one or more of the factors indicated above could be used, such that, for each, a set number of iterations of the operations may be used unless, before that number of iterations has completed, either a defined accuracy has been reached and/or the relevant loss functions have not changed by a significant amount over a defined number of iterations of the operation 12.

In a similar way, the operation 15 in which a determination is made regarding whether the end-to-end training process has been completed may take many forms. For example, the operation 15 may be repeated a number of times, or may be repeated until a target accuracy has been reached. Alternatively, the complete step 15 may determine that the end-to-end training process is complete if the relevant loss functions have not changed by a significant amount over a defined number of iterations of the operation 14. A combination of one or more of the factors indicated above could be used, such that, for each, a set number of iterations of the operations may be used unless, before that number of iterations has completed, either a defined accuracy has been reached and/or the relevant loss functions have not changed by a significant amount over a defined number of iterations of the operation 14.

Many alternative arrangements are possible. For example, many variants of the algorithms 10 and 90 could be used. In one variant of the algorithm 10, the operations 12 to 14 or the operations 12 to 16 may be repeated (for example, whenever the performance of the trained communications system over the real channel degrades).

In the algorithm 90, the choice of the distribution of the transmit vector $p_x(x)$ may be entirely arbitrary and may, for example, depend on the use-case and/or how much is known about the transmitter. However, $p_x(x)$ may somehow sample the total space of possible inputs. It is also possible to let $p_x(x)$ be defined implicitly through the output of the transmitter for randomly selected messages s. In this case, one can use an intertwined training scheme of autoencoder and generator, where the generator is trained for some iterations on the possible outputs of the transmitter after which the autoencoder is trained for some iterations on the generator, and so on. An advantage of this scheme is that the generator is only trained for inputs that are relevant for the optimization of the autoencoder.

The steps of transmitting $x_i$ through the channel (in operation 94 described above) is generally carried out using real hardware and involves transmitting, receiving and storing of signals. Sometimes, these steps can be done based on simulations. In this case, the goal of the generator 64 may be to learn an alternative way of simulating the channel 62, which might, for example, be easier, faster or less complex than an existing channel model. It may also avoid implementing (and debugging) an existing channel model for a deep learning software library.

Since it is difficult for the discriminator to base its decision on only one observation $(y_i|x_i)$, it is possible to train the discriminator on multiple observations $(y_{i,j}|x_{i,j})$, j=1, ..., P, conditioned on the same input. In other words, for a given $x_i$, P conditional outputs $y_{i,j}$, j=1, ..., P, are obtained (either by transmitting P times the same signal $x_i$ over the channel, or by generating P model observations $G(x_i, z_{i,j})$, where $z_{i,j}$ are drawn randomly from $p_z(z)$.) The discriminator's input is then not the pair $\{y_i, x_i\}$ but rather $\{y_{i,1}, \ldots, y_{i,P}, x_i\}$, i.e. $D: \mathbb{C}^{n_x} \times \mathbb{C}^n \mapsto [0,1]$.

Figure 8:
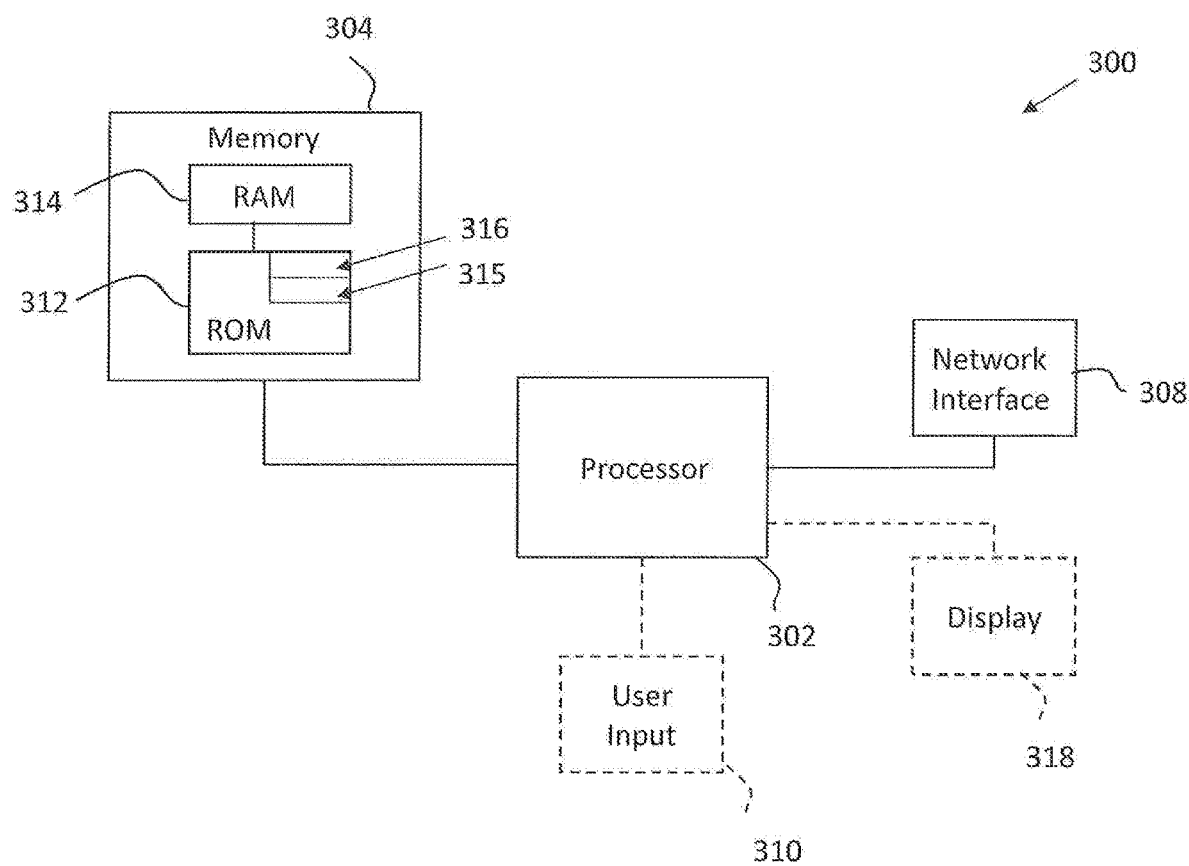
FIG. 8 is a block diagram, of components of a processing system in accordance with an example embodiment.
Figure 9:
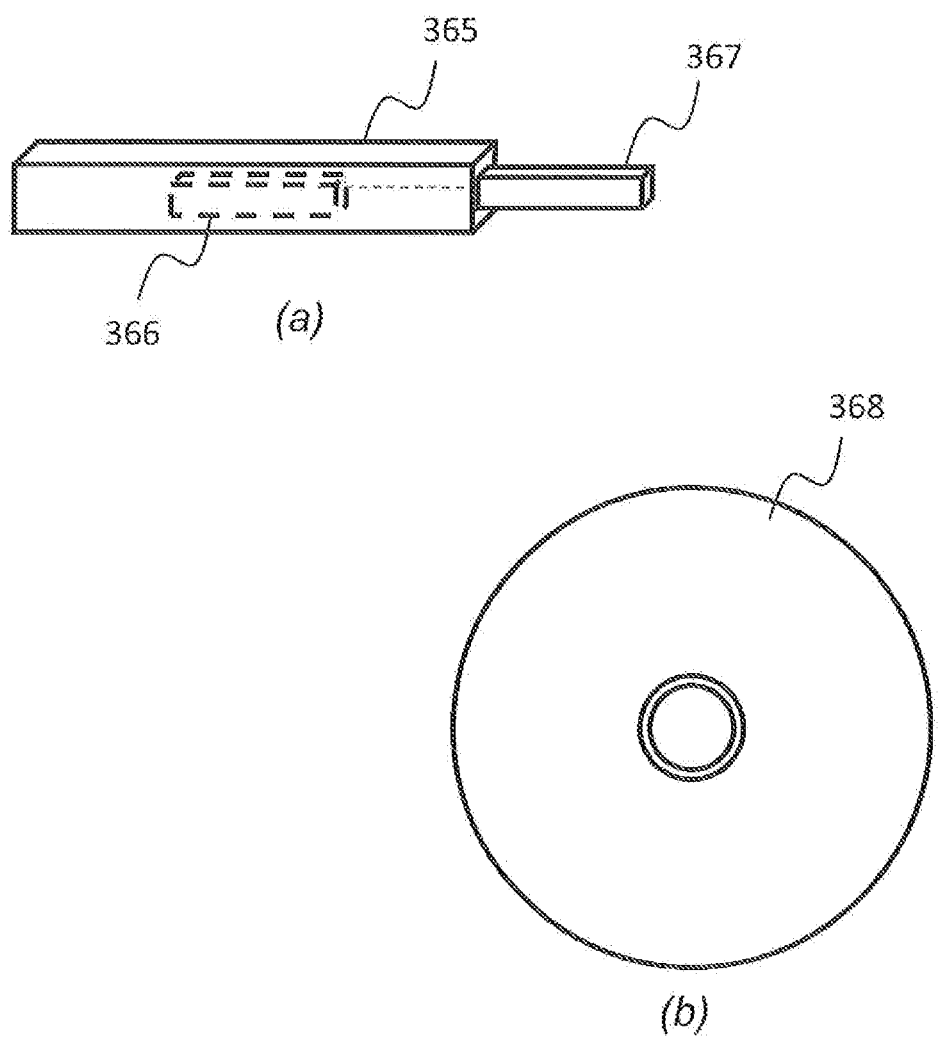
FIGS. 9a and 9b show tangible media, respectively a removable memory unit and a compact disc (CD) storing computer-readable code which when run by a computer perform operations according to embodiments.

For completeness, FIG. 8 is an example schematic diagram of components of one or more of the modules described previously, in accordance with an example embodiment, which hereafter are referred to generically as processing systems 300. A processing system 300 may comprise a processor 302, a memory 304 closely coupled to the processor and comprised of a RAM 314 and ROM 312, and, optionally, user input 310 and a display 318. The processing system 30o may comprise one or more network interfaces 308 for connection to a network, e.g. a modem which may be wired or wireless.

The processor 302 is connected to each of the other components in order to control operation thereof.

The memory 304 may comprise a non-volatile memory, such as a hard disk drive (HDD) or a solid state drive (SSD). The ROM 312 of the memory 304 stores, amongst other things, an operating system 315 and may store software applications 316. The RAM 314 of the memory 304 is used by the processor 302 for the temporary storage of data. The operating system 315 may contain code which, when executed by the processor implements aspects of the algorithms 10 and 90.

The processor 302 may take any suitable form. For instance, it may be a microcontroller, plural microcontrollers, a processor, or plural processors.

The processing system 300 may be a standalone computer, a server, a console, or a network thereof.

In some embodiments, the processing system 300 may also be associated with external software applications. These may be applications stored on a remote server device and may run partly or exclusively on the remote server device. These applications may be termed cloud-hosted applications. The processing system 300 may be in communication with the remote server device in order to utilize the software application stored there. The communication may be processed through the network interface 308.

FIGS. 10a and 10b show tangible media, respectively a removable memory unit 365 and a compact disc (CD) 368, storing computer-readable code which when run by a computer may perform methods according to embodiments described above. The removable memory unit 365 may be a memory stick, e.g. a USB memory stick, having internal memory 366 storing the computer-readable code. The memory 366 may be accessed by a computer system via a connector 367. The CD 368 may be a CD-ROM or a DVD or similar. Other forms of tangible storage media may be used.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any non-transitory media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term "circuitry" refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a server, to perform various functions) and (c) to circuits, such as a microprocessor(s) or a portion of a microprocessor(s), that require software or firmware for operation, even if the software or firmware is not physically present.

If desired, the different functions discussed herein may be performed in a different order and/or concurrently with each other. Furthermore, if desired, one or more of the above-described functions may be optional or may be combined. Similarly, it will also be appreciated that the flow diagrams of FIGS. 2 and 7 are examples only and that various operations depicted therein may be omitted, reordered and/or combined.

It will be appreciated that the above described example embodiments are purely illustrative and are not limiting on the scope of the invention. Other variations and modifications will be apparent to persons skilled in the art upon reading the present specification.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. A method, comprising:
converting generator inputs to a generator output vector using a generator, wherein the generator is a model of a channel of a data transmission system and wherein the generator comprises a generator neural network;
selectively providing either the generator output vector or an output vector of the channel of the data transmission system to an input of a discriminator, wherein the discriminator comprises a discriminator neural network;
using the discriminator to generate a probability indicative of whether the discriminator input is the channel output vector or the generator output vector; and
training at least some weights of the discriminator neural network using a first loss function and training at least some weights of the generator neural network using a second loss function in order to improve an accuracy of the model of the channel.

2. The method as claimed in claim 1, wherein the first loss function is based on an accuracy of the discriminator in generating the probability, both when the generator output vector is selectively provided to the input of the discriminator and when the output vector of the channel of the data transmission system is selectively provided to the input of the discriminator.

3. The method as claimed in claim 1, wherein the second loss function is based on the accuracy of the discriminator in generating the probability when then generator output vector is selectively provided to the input of the discriminator.

4. The method as claimed in claim 1, wherein the generator inputs comprise a transmit vector and a randomly generated input vector.

5. The method as claimed in claim 1, further comprising generating the output vector of the channel by using the channel of the data transmission system to convert a transmit vector into the channel output vector.

6. The method as claimed in claim 1, wherein at least some weights of the discriminator and generator neural networks are trained using stochastic gradient descent or stochastic gradient ascent.

7. The method as claimed in claim 1, wherein one or both of the discriminator neural network and the generator neural network are multi-layer neural networks.

8. The method as claimed in claim 1, wherein the data transmission system comprises a transmitter, the channel and a receiver.

9. The method as claimed in claim 1, wherein either the generator output vector or the output vector of the channel is provided to a discriminator depending on the state of a selector.

10. The method as claimed in claim 9, wherein the selector is a switch.

11. The method as claimed in claim 1, wherein the first loss function is configured to increase an accuracy of the discriminator.

12. The method as claimed in claim 1, wherein the second loss function in configured to increase an accuracy of the generator.

13. A method, comprising:
generating a model of a channel of a data transmission system having a transmitter, a channel and a receiver, wherein the channel is modelled by the channel model, wherein an accuracy of the model of the channel is improved using the method as claimed in claim 1;
converting first input data bits into symbols for transmission by the data transmission system, wherein the transmitter is represented using a transmitter neural network and the receiver is represented using a receiver neural network;

transmitting one or more symbols from the transmitter to the receiver via the channel model; and training at least some weights of the transmitter and receiver neural networks using a transmission system loss function.

14. An apparatus, comprising:

a generator comprising a first input, a second input, a generator neural network and an output, wherein the generator is configured to use the generator neural network to convert generator inputs to a generator output vector, wherein the generator is a model of a channel of a data transmission system;

a discriminator comprising a first input and a first output and a discriminator neural network; and a selector configured to selectively provide either the generator output vector or an output vector of the channel of the data transmission system to an input of the discriminator;

wherein:

the discriminator is configured to output a probability indicative of whether the discriminator input is the channel output vector or the generator output vector; and wherein at least some weights of the discriminator neural network are trained using a first loss function and at least some weights of the generator neural network are trained using a second loss function in order to improve an accuracy of the model of the channel.

15. An apparatus, comprising:

at least one processor; and at least one memory including computer program code, the at least one memory and the computer program code configured to, with the at least one processor, cause the apparatus at least to perform:

converting generator inputs to a generator output vector using a generator, wherein the generator is a model of a channel of a data transmission system and wherein the generator comprises a generator neural network;

selectively providing either the generator output vector or an output vector of the channel of the data transmission system to an input of a discriminator, wherein the discriminator comprises a discriminator neural network;

using the discriminator to generate a probability indicative of whether the discriminator input is the channel output vector or the generator output vector; and training at least some weights of the discriminator neural network using a first loss function and training at least some weights of the generator neural network using a second loss function in order to improve an accuracy of the model of the channel.

16. The apparatus according to claim 15, wherein the first loss function is based on an accuracy of the discriminator in generating the probability, both when the generator output vector is selectively provided to the input of the discriminator and when the output vector of the channel of the data transmission system is selectively provided to the input of the discriminator.

17. The apparatus according to claim 15, wherein the second loss function is based on the accuracy of the discriminator in generating the probability when then generator output vector is selectively provided to the input of the discriminator.

18. The apparatus according to claim 15, wherein the generator inputs comprise a transmit vector and a randomly generated input vector.

19. The apparatus according to claim 15, wherein the processor and memory are further configured, with the computer program code, to cause the apparatus to perform generating the output vector of the channel by using the channel of the data transmission system to convert a transmit vector into the channel output vector.

20. The apparatus of claim 15, wherein at least some weights of the discriminator and generator neural networks are trained using stochastic gradient descent or stochastic gradient ascent.

* * * * *